July 29, 1969

B. H. SNOW 3,458,806

SEQUENTIAL TESTER FOR INTERPIN IMPEDANCES INCLUDING
RESISTOR-DIODE COMBINATION STANDARDS

Filed Feb. 3, 1966

INVENTOR.
BARTON H. SNOW
BY
ATTORNEY

July 29, 1969

B. H. SNOW 3,458,806

SEQUENTIAL TESTER FOR INTERPIN IMPEDANCES INCLUDING
RESISTOR-DIODE COMBINATION STANDARDS

Filed Feb. 3, 1966

INVENTOR.
BARTON H. SNOW
BY
ATTORNEY

United States Patent Office 3,458,806
Patented July 29, 1969

3,458,806
SEQUENTIAL TESTER FOR INTERPIN IMPED-
ANCES INCLUDING RESISTOR-DIODE COM-
BINATION STANDARDS
Barton H. Snow, Cincinnati, Ohio, assignor to General
Electric Company, a corporation of New York
Filed Feb. 3, 1966, Ser. No. 524,918
Int. Cl. G01r 31/04
U.S. Cl. 324—73                                    4 Claims

ABSTRACT OF THE DISCLOSURE

A circuit for sequentially testing the impedance between pairs of pins of a multi-pin electrical connector is disclosed which includes means for establishing that a given interpin resistance is within a specified tolerance band and means for establishing that other pin pairs are either open circuited or short circuited. The means for establishing the existence of an interpin resistance within a tolerance band comprises a reference resistance means serially connected with the interpin impedance and means for alternately reversing polarity of a voltage drop across the serially connected interpin impedance reference resistance, the reference resistance comprising a parallel circuit each branch of which comprises a resistor and a diode in series, said diodes being oppositely poled, whereby the presence of the positive voltage level at a point intermediate the interpin impedance and the reference resistance means will indicate that the specified interpin impedance is within limits.

The present invention relates to improvements in electrical test circuits.

In many electrical and electronic devices it is an accepted practice to provide replaceable modules so that components of an integrated system may be readily replaced or located in locations remote from one another. Such modulized "packaging" gives great advantages in flexibility of design as well as convenience in repair and maintenance. Such electrical circuits often have a great number of leads which are connected to a multipin connector or plug for ready installation into a given system. It is, of course, essential that these circuits be correctly wired and that the leads thereto be correctly connected to the multipin plug therefor. The fact that such modules are sealed further adds to the problems of testing and inspection to insure that they will perform their intended function. While testing can be done employing a master system into which the components are plugged, oftentimes it is extremely time consuming to test in full the various operating conditions which would reliably reflect that a given module or circuit was, in fact, correctly wired. Another effective method of determining that the wiring has been correctly done is to measure the resistance between the individual pins of the connector or plug. This, however, is an extremely time consuming task since, for example, with a fifty pin plug there are twelve hundred and fifty pin pair possibilities to test.

The object of the invention is to facilitate rapid and acurate testing of electrical circuits by measurement of the interpin resistances of the connector plug therefor.

To this end a circuit for testing the interpin resistances between the pins of a multipin connector for an electrical circuit is provided. Each pair of pins to be tested is checked against one of a plurality of reference resistance means. A given pin pair is connected with the reference resistance means therefor and an output signal is generated if the interpin resistance corresponds to the value established by the reference resistance means. This output signal then causes another pair of pins to be connected to reference resistance means establishing the correct resistance value therefor and a further output signal will be generated. The device thus operates sequentially and automatically so long as the interpin resistances are of correct value. In the event that the interpin resistance of a given pin pair is not within the value established by the reference resistance means, the testing circuit then identifies the faculty pin pair.

Preferably the reference resistance means are such that interpin resistances of both finite and infinite value may be tested. Advantageously in the case of testing interpin resistances of finite value, the reference resistance means comprises a parallel circuit, each branch of which has a resistor and diode in series with the diodes being oppositely poled. The reference resistance means is then placed in series with the interpin resistance to be tested and a voltage of one polarity impressed thereacross. If the interpin resistance is within a given tolerance limit in one direction, a voltage signal actuates means for reversing the polarity and creating a second voltage signal if the interpin resistance is within a given tolerance limit in the other direction. This second voltage signal generates the output signal to bring a second pin pair and reference resistance means into the testing circuit as well as actuating the polarity reversing means so that testing of the several pin pairs of an electrical plug can proceed sequentially.

The above and other related objects and features of the invention will be apparent from a reading of the following description of the disclosure found in the accompanying drawings and the novelty thereof pointed out in the appended claims.

In the drawings:
FIGURE 1 is a schematic view of electrical testing circuit embodying the present invention; and
FIGURE 2 is a schematic view of other portions of this test device.

In FIGURE 1 an electronic circuit to be tested is indicated at 10. For purposes illustrating the invention, it is assumed that this is a rather simple electronic circuit having four leads that are to be connected to a cooperative circuit. Such a circuit could be used in many electronic controls where the components are modulized so that they may readily be replaced simply by detaching a plug which is diagrammatically indicated at 12, the plug 12 being connected to the electronic circuit by a cord 14. The four circuit leads extend through the cord 14 and are respectively connected to pins 16, 18, 20, and 22 of the plug 12.

The apparatus of the present invention is adapted to determine the interpin resistance between these pins as a check to determine whether the lead wires are properly connected thereto as well as to determine whether or not the lead wires and other connections within the circuit 10 are properly made. With a four pin plug there are six resistance measurements which are automatically made for a complete check on interpin resistance.

The plug 12 is connected to a suitable receptacle 24 from which lead wires hereinafter described extend to a stepping switch indicated generally by reference character 26.

The stepping switch 26 is of known design and comprises a plurality of contact points which are mounted on a semicylindrical shell indicated by a phantom line. These stationary contact points are arranged in rows along the surface of the cylindrical shell and for purposes of illustration three rows 28, 30, and 32 are herein illustrated with the angular spacing therebetween exaggerated beyond what would normally be employed. The individual contacts of each row are identified by reference characters $a$, $b$, $c$, $d$, $e$, and $f$. A wiper 34 comprises contact points $m$, $n$, $o$, $p$, $q$, and $r$ which are arranged to engage the contact points $a$, $b$, $c$, $d$, $e$, and $f$ respectively of any given row of stationary contact points. Mechanism including a solenoid 36 is provided for rotating the wiper 34 about the axis of the semicylindrical shell to selectively bring its contact points into engagement with the contact points of the stationary rows 28, 30, and 32.

In the illustrated position the wiper contacts 34 are in engagement with the contact points 30a, 30b, etc. The several stationary contacts a and b are connected by appropriate lead wires to the pins 16, 18, 20, and 22, and wiper contacts n and o and m and p are also electrically interconnected so that the electrical resistance between the respective pins can be introduced into the testing circuit between the stationary contacts c and d. All of the contacts d are joined to a common conductor 38 which extends to an amplifier 40 so that the potential thereat will actuate a relay 42 as later explained. The contacts d are also respectively connected to contacts e and through wiper contacts q and r to fixed contact f to provide means for selecting a predetermined electrical reference against which the interpin resistance is to be tested. Thus it will be seen that the contact points f are respectively connected by leads 44, 46, and 48 to one side of parallel circuits 50, 52, and 54 respectively. The branches of the parallel circuits respectively comprise a resistor t and diode u and resistor x and diode y.

Energization of the testing circuit is provided by a power supply 56 having a positive lead 58 and a negative lead 60 which are connected respectively to contact points 62, 64, and 66, 68 of the relay 42. In the illustrated position of the relay 42 a positive voltage is impressed across one side of the interpin (of plug 12) resistance by way of contact point 62, contactor 70, and a lead wire 72 which is joined to each of the stationary contacts c. The electrical circuit is then completed by the connection of the opposite side of the pin pair being tested to the stationary contact a and back through a selected parallel reference circuit 50, 52, or 54.

Operation of this testing apparatus will now be described in connection with ascertaining whether a correct interpin resistance exists between the pins 16 and 20, the wiper arm 34 being positioned for such a test. There will be a current flow from the positive terminal 58 of the power supply through relay contact 62, contactor 70, and lead 72 through the stepping switch contacts 30c, 34o, 34n, and 30b to the pin 20. Current then flows through whatever resistance exists between pin 20 and pin 16, this resistance being indicated in phantom by reference character z. Current then flows from pin 16 through contacts 30a, 34m, 34p, 34d, to the reference circuit 52. With this polarity current then flows through diode 52 and resistor 52x back through a contact bar 74 (of relay 42), contact point 68, to the negative output 60 of the power supply.

The described circuitry thus puts the interpin resistance z in series with the reference resistor 52x and includes the resistance of diode 52y. The value of resistor 52x is selected such that the voltage drop thereacross will be greater than the proper voltage across the interpin resistance z. If the resistance z is less than the allowable maximum value which is thus established, pin 16 and hence contact point 30d and conductor 38 will likewise be positive. The fact that interpin resistance z is within an acceptable maximum tolerance limit is reflected by an output signal, namely energization of relay 42, which then results in testing resistance z to determine if it is within a minimum tolerance limit. The means for energizing relay 42 will now be described. The amplifier 40 is preferably polarity sensitive and advantageously may take the form of a differential operational amplifier, well known to those in the art. Such amplifiers also invert the polarity of the input. Thus the output on lead 76 would be negative. This output provides an input to an integrating amplifier 78 having a positive feedback through capacitor 80. The amplifier 78 is also of the polarity-inverting type. Thus whenever a negative input is provided thereto from the amplifier 40, there will be a positive output from the amplifier 78 which is fed to relay 42. The relay 42 is actuated once a predetermined, positive voltage is impressed thereon. Since the amplifier 78 is of the integrating type, it is not necessary to get a given voltage level on conductor 38 but only a positive voltage which is quickly built up by the integrating effect of amplifier 78 to provide the necessary actuating voltage of relay 42.

In summary, relay 42 will be actuated if the interpin resistance z is less than a maximum reference resistance value established by the resistor 52x (including also the resistance of diode 52y).

To the end of testing whether interpin resistance z is within a minimum tolerance limit, further reference is made to the relay 42 which is of the double acting type that remains in a given position once the current pulse of predetermined magnitude has been fed to it. Reference is also made to the fact that the integrating amplifier 78 normally has a relatively long time constant. It is, with the described circuit, essential that the signal output from the integrating amplifier 78 be grounded or otherwise removed to reset the testing circuitry to determine if the interpin resistance z is within a minimum value tolerance limit. To this end a further relay 82 is energized by a positive output from the integrating relay 78. The relay 82 is of the momentary contact type and has a contactor 84 which is arranged to complete a feedback circuit through resistor 86 which will render the output of amplifier 78 zero or give it a negative value. The relay 82 is also of the double acting type so that a pulsing energization thereof will cause it to go from one position to another, momentarily completing the feedback circuit for the purposes above described. The relays 42 and 82 are arranged to be actuated at substantially the same voltage values to obtain the sequence of operation above referred to.

Upon energization of the relay 42 the contactor arms 70 and 74 are respectively shifted to contact points 66 and 64, thereby reversing the polarity of the voltage across the series circuit of the interpin resistance z and the parallel reference circuit 52. With the current thus reversed the resistance z is effectively in series with the resistance 52t as current passes through the diode 52u. Again a positive signal will be impressed on the lead wire 38 if the value of resistance z is within a desired minimum tolerance limit. The value of the interpin resistance z must be greater than the minimum reference resistance value established by the resistor 52t (and the internal resistance of the diode 52u) in order to obtain a positive voltage input to amplifier 40. If this minimum tolerance limit is met, a positive signal is fed to the amplifier 40 and the integrator 78 provides the desired positive signal for again energizing relay 42.

Having checked the interpin resistance z for both minimum and maximum values, the wiper arm 34 of the stepping motor will be incrementally moved to check another resistance between another pair of pins. The means for accomplishing this purpose comprise a further contactor arm 88 of the relay 42. When the relay 42 was actuated after having checked the maximum value of resistance z, the contact arm 88 completed a circuit from the output of the integrating amplifier 78 through contact point 90 to the input of solenoid 36. Solenoid 36, it will be noted, is set to be actuated at a lower voltage level than the relays 42 and 82. Thus, the sequence of operation is that the wiper arm 34 and its associated contacts will move away from the row of fixed contacts 30 towards the adjacent row 32 and, while so moving, the relays 42 and 82 will be actuated due to the integrating action of amplifier 78.

The testing circuitry is thus reset to the condition illustrated in FIGURE 1. The interpin resistance between pin 16 and pin 22 will now be substituted for the interpin resistance between pins 16 and 20. Presuming that this latter interpin resistance should be different from that for the pins 16 and 20, the contact points e, q, f, and r will now substitute the reference circuit 54 for the reference circuit 52. The same sequence of events will be followed in checking to determine if the interpin resistance between pins 16 and 20 is with a maximum tolerance limit. Current flows through the diode 54y and resistor 54x causing actuation of the relays 42 and 82 to reverse the polarity across the testing circuit and provide means for checking the minimum resistance value between the pins 22 and 16 through the resistor 54t as current flows through the diode 54u. Upon a successful completion of such tolerance limits the solenoid 36 will again be actuated and a further row of fixed contact points (not shown) will be engaged by the rotary wiper 34. This sequence of events is repeated till all possible interpin resistances have been checked out.

It will be apparent that this simple and automatic equipment provides for a ready check to see if the interpin resistances of the plug 18 are within given tolerance limits. If such limits are exceeded, the test device ceases to operate and a faulty circuit is identified and can then be further checked to determine the exact cause of trouble. If desired, a signal such as a light, can be provided to alert an operator when the test circuit fails to sequence itself as a result of an unacceptable interpin resistance.

The testing circuitry described in connection with FIGURE 1 assumed that the interpin resistance between the several pins described had a finite value which would be tested for minimum and maximum tolerance limits by the reference circuits 50, 52, and 54. FIGURE 2 illustrates further reference circuits for infinite values which are employed to determine whether or not the interpin resistance between a given pair of pins is a short circuit where this condition should exist or an open circuit where that condition should exist.

FIGURE 2 thus shows further portions of the stepping switch 26 again illustrating the stationary row of contacts 32, previously described, employed in checking the interpin resistance between pins 16 and 22 against the parallel reference circuit 54. Further rows of pins 94 and 96 are respectively employed for checking the resistance between pins 18 and 20 and 18 and 22. In the case of testing for either a short circuit or an open circuit there are, of course, no tolerance limits requiring testing for minimum and maximum values. In either instance the interpin resistance is either sufficiently low or sufficiently high. The circuitry now to be described automatically sequences the stepping switch 26 so that the system is compatible for "one-sided" checks of infinite resistances as well as for checking maximum and minimum values of finite resistances.

Contacts 94a, 34m, 34p, and 94d place one side of the interpin resistance into the testing circuit while contacts 94b, 34n, 34o, and 94c place the other side of the interpin resistance into the testing circuit. The contact 94c is connected through the common lead 72 to the relay contactor 70 so that positive and negative potentials may be provided thereto as the relay 42 is actuated. The opposite side of the interpin resistance, namely from contact 94d, follows a circuit through lead 99 to a reference circuit 100 which comprises two parallel branches formed by a resistor 102 and diode 104 in one branch and resistor 106 and diode 108 in the other branch, with the diodes being oppositely poled. This parallel circuit is then in series with a resistor 110 which is connected to the contact arm 74 of relay 42. Assuming current flows with the contact arms as illustrated, a positive current will flow through lead 72 to contact 94c, through the stepping switch to pin 20, through the interpin resistance to pin 18, back to contact 94d, through lead 99, through the diode 108, resistor 106, and resistor 110. If a short circuit exists, the values of resistors 106 and 110 are chosen such that a positive potential will exist on lead 112 if the desired condition of a short circuit between pins 18 and 20 exists. This positive potential is transmitted through lead 112 to stationary contact 94e, through the wiper contacts 34q, and r to stationary contact 94f which is connected to line 38 providing an input to the amplifier 40. The values of the resistors 110 and 106 are chosen such that a positive signal will appear on lead 112 if there is no substantial resistance between the pins 18 and 20. That is to say, the voltage drop across the resistor 110 is slightly greater than the resistor 106 (also taking into account the resistance across diode 108). If, however, the combination of the resistance of resistor 106 and the interpin resistance between pins 18 and 20 is greater than the resistance of resistor 110, a negative voltage will appear on lead 112 and the relay 42 will not be actuated, and, as was explained above, failure to sequence the relay 42 indicates that an improper interpin resistance has been detected by the testing circuitry. In this case it indicates a lack of an infinitely low resistance, viz, a short circuit.

Since the reference circuit 100 establishes what is essentially an infinite resistance value, only a "one sided" check is required. However, it is necessary to provide two positive voltage signals to the amplifier 40 to obtain an output signal which will cause the switch wiper arm to move to the next row of stationary contacts.

When current flow through diode 108 produces a positive input to amplifier 40, the relays 42, 82 are actuated as previously described. The polarity across the series connected pin pair 18, 20 and reference circuit 100 is reversed. Current now flows through diode 104 and resistors 102, 110. The relative values of resistors 102, 110 are chosen so that a positive signal appears on lead 112. This positive voltage signal is fed to amplifier 40 again energizing relays 42 and 78 and also actuating solenoid 36 causing wiper arm 34 to move to the contact row 96 as previously explained.

It is assumed that the interpin resistance across pins 18 and 22 should be an open circuit, that is, have an infinitely high resistance. The connections to the stationary row of contacts 96 provides for such a test.

The stationary contacts 96c and d, when engaged by the contacts of the wiper 34, place the resistance between pins 18 and 22 into the circuit. One side of the interpin resistance goes from the contact 96c to the lead 72 and the relay contactor 70 for alternate connection with the positive and negative outputs of the power supply. The opposite side of the interpin resistance is connected from contact point 96d through line 114 to a reference circuit 116. This reference circuit comprises a resistor 120 connected to the contactor 74 and a resistor 122 therebetween connected to ground. Assuming that the contactors are in the condition illustrated in the drawing, positive current will flow from lead 72 to the pin 22. Current will then flow through a diode 126 (assuming an open circuit exists) to contact point 96a and contact 96d, through lead 114, to place a positive potential on lead 128. The current flow path is then completed through resistors 120 and 122.

The flow path for this polarity simply provides a voltage signal on lead 128 which is transmitted through contacts 96f, 34r, 34q and 96 to the input lead 38 for amplifier 40. This positive signal actuates relays 42, 82 as before to reverse the polarity across the series connected reference circuit 116 and resistance between pins 18, 22.

If an open circuit condition exists, current will flow through resistors 120, 122 to ground. The values of these resistors are selected so that a very small positive voltage signal will be generated on lead 128 under this condition. This voltage signal is fed to amplifier 40 energizing relays 42 and 82 and also solenoid 36 to sequence to stepping switch 26 to test another interpin resistance.

If there is not a substantial open circuit between pins 18 and 20, current will flow through lead 114 and the pins 18 and 22 back to the negative side of the power supply through contact point 66. This will prevent the voltage on lead 128 from reaching a positive value and further sequencing of the stepping motor will be stopped indicating an improper resistance value.

Having thus described the invention, what is claimed as novel and desired to be secured by Letters Patent of the United States is:

1. A circuit for testing the interpin resistances between the pins of a multipin connector for an electric circuit, said test circuit comprising, a plurality of reference resistance means wherein each pair of pins to be tested has a specified reference resistance means, at least one of said reference resistance means comprising a parallel circuit, each branch of which is formed by a resistor and diode in series, said diodes being oppositely poled, means for serially electrically connecting successive pairs of pins with the reference resistance means therefor, means for impressing a voltage of given polarity across this series connection whereby current flows through one of said parallel branches, the value of the resistor thereof being such that a voltage signal at an intermediate point will be at a given level if the interpin resistance is within one tolerance limit, means responsive to said given level of the voltage signal for reversing the polarity across said series connection whereby current will flow through the other parallel branch, the value of the resistor thereof being such that a voltage signal of the same given level will be established at the same intermediate point if the interpin resistance is within the other tolerance limit, said polarity reversing means being again actuated by the second voltage signal of a given level, and means responsive to the second voltage signal for generating said output signal whereby the interpin resistance of one pin pair is checked against given tolerance limits and the interpin resistance of a successive pin pair is then automatically checked.

2. A circuit as in claim 1 which additionally includes other reference resistance means for establishing the existence of a short circuit between the pins to be checked, other reference resistance means for establishing the existence of an infinite interpin resistance, each of said other reference means also being connected in series with the interpin resistance therefor and establishing an intermediate voltage signal of said given level, means for selectively connecting said intermediate signals to said polarity reversing means, and means for generating an intermediate voltage signal of said given level when the opposite polarity is imposed thereacross.

3. A circuit as in claim 2 wherein the reference resistance means for establishing the existence of said short circuit comprises a parallel circuit of two branches each having a resistor and diode in series with the diodes being oppositely poled, said parallel circuit further being in series with a resistor and further wherein the intermediate voltage signal is derived from between the resistor and parallel circuit of the reference resistance means.

4. A circuit as in claim 2 wherein the reference resistance means for establishing the existence of an infinite interpin resistance comprises a resistor and diode in series with said voltage impressing means and a resistor connecting a point between the said series connected resistor and diode to ground, the said intermediate voltage signal being derived from a point intermediate said resistors.

References Cited

UNITED STATES PATENTS 3,065,414   11/1962   Sears _____ 324—73 XR

RUDOLPH V. ROLINEC, Primary Examiner

E. L. STOLARUN, Assistant Examiner

U.S. Cl. X.R.

324—62